United States Patent [19]

Nelson

[11] 4,094,148
[45] June 13, 1978

[54] THERMAL STORAGE WITH MOLTEN SALT FOR PEAKING POWER

[75] Inventor: Hazen E. Nelson, Acton, Mass.

[73] Assignee: Stone & Webster Engineering Corporation, Boston, Mass.

[21] Appl. No.: 777,458

[22] Filed: Mar. 14, 1977

[51] Int. Cl.² ............... F01K 3/00; F01K 23/10
[52] U.S. Cl. ................................. 60/652; 60/659; 60/39.18 B; 60/655
[58] Field of Search .......... 60/652, 659, 655, 39.18 B, 60/39.18 R, 39.18 A, 39.18 C; 165/104.5, DIG. 4

[56] References Cited

U.S. PATENT DOCUMENTS

| | | | |
|---|---|---|---|
| 3,299,945 | 1/1967 | Rice et al. | 165/4 |
| 3,886,749 | 6/1975 | Pacault | 60/652 |
| 3,974,642 | 8/1976 | Pacault | 60/659 X |

Primary Examiner—Allen M. Ostrager
Attorney, Agent, or Firm—Morgan, Finnegan, Pine, Foley & Lee

[57] ABSTRACT

An improvement in the process for the generation of electrical power in which heat released by exhaust gases derived from the combustion of gaseous products in a coal gasification process is stored and utilized to generated increased electrical power during peak demand periods.

13 Claims, 4 Drawing Figures

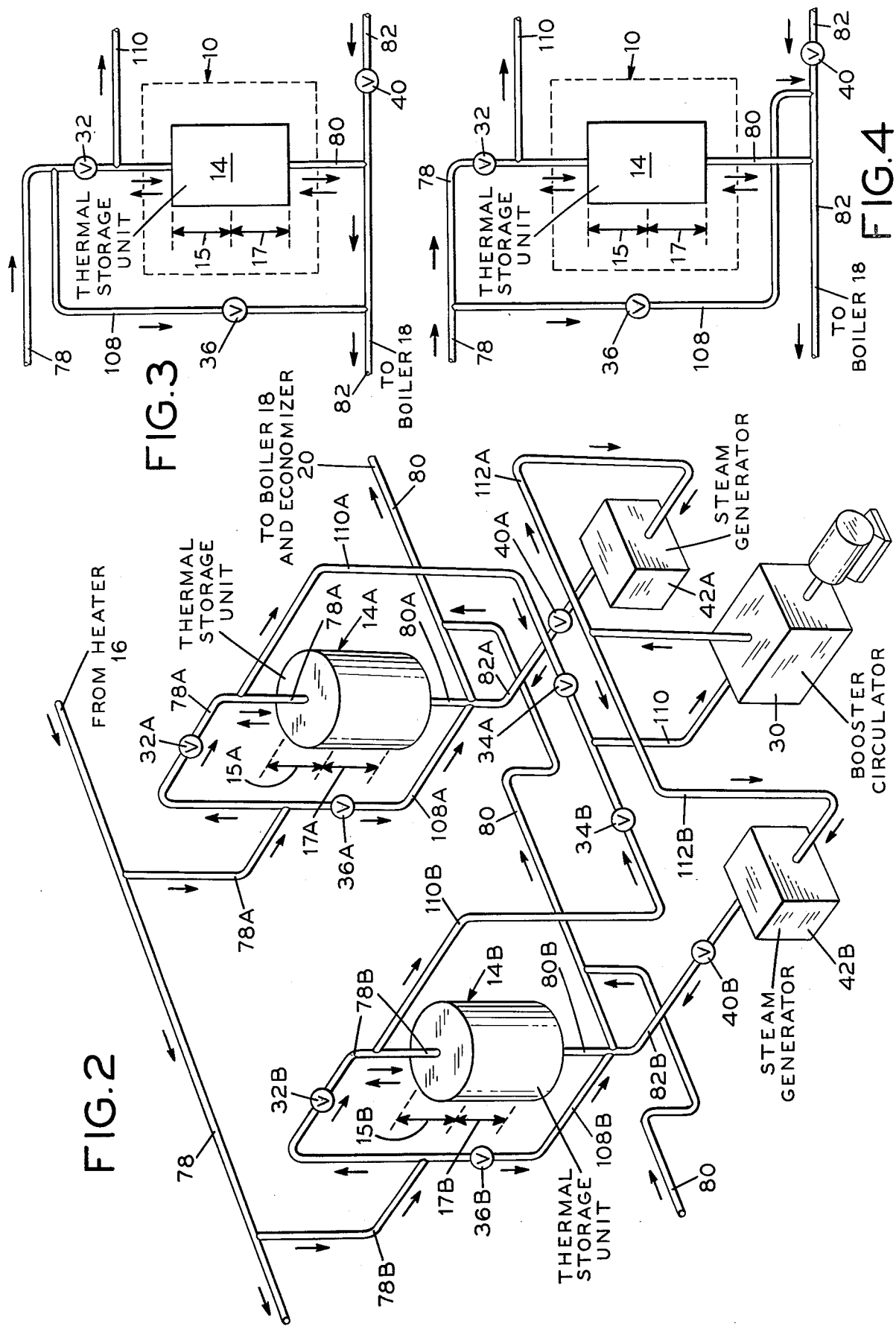

THERMAL STORAGE WITH MOLTEN SALT FOR PEAKING POWER

FIELD OF THE INVENTION

The present invention relates to the generation of electrical power.

In one of its aspects, the invention relates to the increased generation of electrical power at peak demand periods.

In a more specific aspect, the present invention relates to the storage of heat in a thermal storage medium which heat is utilized at peak demand periods to generate increased electrical power.

BACKGROUND OF THE INVENTION

As is well known to those skilled in the art, conventional electrical power generation facilities in many instances utilize fuel oil or natural gas as the source of energy for generating electrical power. In the past these fuels, which possess properties that make them particularly suitable for supplying increased electrical power during peak demand periods, were relatively inexpensive and in plentiful supply. Unfortunately, the high cost of petroleum crude oil and natural gas, and the uncertainty of our sources of these fuels, now necessitates that different energy sources be explored and new techniques for effective utilization of both old and new sources of energy be developed.

Coal, which is in great supply and is relatively inexpensive, is among the materials suggested by the art as a source of energy for the generation of electrical power. Coal has the capacity to be gasified and used to drive gas turbines which can be implemented for the production of electrical power. In operation, the gas turbines develop low levels of waste heat which, under conventional techniques, has been rejected to the atmosphere or in part recovered by generating steam for additional power regeneration. Unfortunately, the techniques for the gasification of coal for the generation of electrical power have not been entirely satisfactory, due in part to the relative inability of these techniques to vary electrical power output to follow the system load demands and supply increased electrical power at peak demand periods.

SUMMARY OF THE INVENTION

It is, therefore, an object of the present invention to provide a method for generating electrical power using coal as the source of energy, which method is readily capable of generating increased electrical power at peak demand periods.

It is another object of the invention to provide a non-air polluting method for generating electrical power using coal as the source of energy, which method is readily capable of generating increased electrical power at peak demand periods.

It is another object of the invention to provide a method for generating electrical power using coal as the source of energy, which method utilizes a heat storage system to store heat during non-peak demand periods for use of such heat at peak demand periods to generate increased electrical power.

A further object of the invention is to provide a method for generating electrical power using coal as the source of energy, which method permits the continuous output of electrical power during non-peak demand periods while storing energy for use at peak demand periods to generate increased electrical power.

Still another object of the invention is to provide a heat storage system which can be readily integrated into an electrical power generation process, which uses coal as the energy source, to achieve the more economical production of electrical power at peak demand periods.

Broadly contemplated, the present invention provides an improvement in a process for the generation of electrical power wherein coal is gasified to produce a stream of heated fuel gases. The heated fuel gases are used to drive a gas turbine-generator which produces electrical power during peak and non-peak electrical power demand periods. The exhaust gases released from the gas turbine are passed in heat exchange relationship with a heat exchange gas to heat said heat exchange gas. The heated heat exchange gas is then introduced into a thermal storage zone wherein during non-peak demand periods the major portion of the heat released by said heated heat exchange gas is stored in said thermal storage zone for use during peak demand periods. The thermal storage zone uses a heat storage substance such as sodium hydroxide which absorbs and retains large quantities of heat by transition from solid to liquid state.

The heat exchange gas is then introduced into a first steam generation zone to generate steam for producing electrical power during peak and non-peak demand periods.

During peak demand periods, the heated heat exchange gas and additional heat exchange gas from storage are passed in reverse flow through the thermal storage zone to absorb the stored heat. The now heated heat exchange gas is delivered to steam generation equipment to generate steam for producing increased electrical power during peak demand periods.

DESCRIPTION OF THE DRAWING

FIG. 2 is a isometric representation illustrating an arrangement of some of the apparatus parts for an embodiment of the invention utilizing two thermal storage units.

FIG. 3 is a partial schematic representation of an alternate arrangement for introducing heat exchange gas into boiler 18 and thermal storage zone 10.

FIG. 4 is a partial schematic representation of another alternate arrangement for introducing heat exchange gas into boiler 18 and thermal storage zone 10.

DETAILED DESCRIPTION OF THE INVENTION

Figure 1:
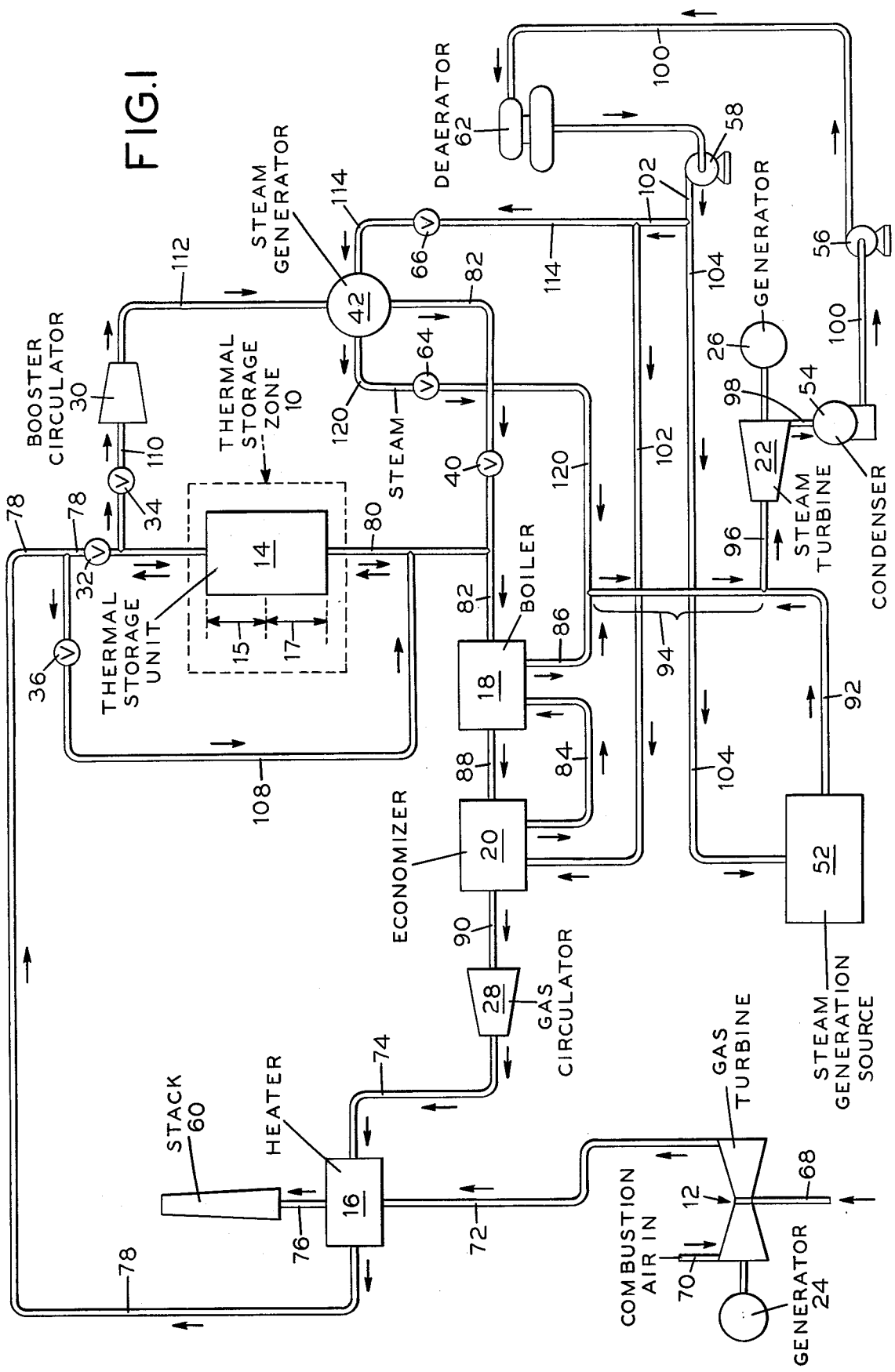
FIG. 1 is a schematic representation illustrating one embodiment of the invention.

The system shown in FIG. 1 utilizes a thermal storage zone generally represented by reference numeral 10 to store waste heat released by exhaust gases from gas turbine 12. Thermal storage zone 10 can consist of either a single thermal storage unit or a plurality of thermal storage units.

Essentially, the system includes: equipment for the production of electrical power, equipment for the recovery of heat and the generation of steam for use during peak and non-peak demand periods, and a thermal storage zone for the storage of heat during non-peak demand periods.

The equipment for the production of electrical power is comprised of gas turbine 12, steam turbine 22, and electrical generators 24 and 26. Gas turbine 12 is provided with a combustion air intake line 70, a fuel gas inlet line 68, and an exhaust gas outlet line 72. Steam turbine 22 is provided with a steam inlet line 96 and an outlet line 98.

Thermal storage zone 10 is provided with one or more thermal storage units 14, a heat exchange gas inlet line 78, and a heat exchange gas outlet line 80. Valves 32, 34, 36, and 40 are provided respectively with lines 78, 110, 108, and 82 to selectively deliver waste heat to and remove stored heat from thermal storage zone 10.

The waste heat recovery and steam generation equipment used during both peak and non-peak demand periods is comprised of heater 16; boiler 18; economizer 20; gas circulator 28; heat exchange gas lines 74, 78, 80, 82, 88, and 90; water lines 84, 100, and 102; and steam lines 86, 94, 96, and 120.

The waste heat recovery and steam generation equipment activated during peak demand periods is comprised of booster circulator 30; steam generator 42; heat exchange gas lines 82, 108, 110, and 112, water line 114; steam line 120; and valves 64 and 66 associated with lines 120 and 114, respectively.

As shown in FIG. 1, fuel gas from a coal gasification process (not shown) is directed through line 68 at a temperature of about 50° to 130° F. into gas turbine 12 wherein the fuel gas is combined with combustion air which enters gas turbine 12 through line 70 at a temperature of about 50° to 130° F. Gas turbine 12 is a conventional gas turbine which normally includes a combustion chamber wherein fuel gas is reacted with combustion air. As is known, gas turbines can be used as a driving force for operating electric power producing generators. Thus, associated with gas turbine 12 is a conventional generator 24 which is suitable for generating large amounts of electrical power by techniques which are well known to those skilled in the art.

Operation of gas turbine 12 produces exhaust gases which must be removed from the gas turbine. According to some conventional techniques, the exhaust gases are either discharged directly to the atmosphere or alternatively are cooled prior to release to the atmosphere by a cooling medium such as water. According to the present invention, the heat transferred from the exhaust gases is stored, to be utilized to generate increased electrical power at peak demand periods as will be explained in detail hereafter.

Thus, the exhaust gases, which are generally at a temperature of about 950° to 1150° F., exit gas turbine 12 through line 72 and are directed into heater 16 wherein the exhaust gases are passed in indirect contact with a heat exchange gas which enters heater 16 through line 74 at a temperature of about 375° to 400° F. and at a pressure of about 18 to 40 p.s.i.a. The heat heat exchange gas introduced into heater 16 can comprise air, helium, hydrogen, nitrogen, argon, carbon dioxide, low oxygen content combustion products of hydrocarbons and mixtures of the foregoing. The preferred heat exchange gas is air.

Heater 16 is a conventional heat exchanger and can be of type generally known in the art as the flat plate type heat exchanger. In FIG. 1, one heater is shown but it is to be understood that more than one heater can be used, depending upon the system load demand and the capacity of the heater employed.

As a result of the indirect contacting with the exhaust gases in heater 16, the heat exchange gas is heated to a temperature of about 500° to 1000° F.

The exhaust gases leave heater 16 through line 76 at a temperature of about 425° to 600° F. and approximately atmospheric pressure and are directed into stack 60 where they are released to the atmosphere.

The heat exchange gas having been heated to a temperature of about 500° to 1000° F. exits heater 16 through line 78 and is directed into thermal storage zone 10.

As used herein the term "peak demand periods" is meant to connote those periods in which there is an increased demand for electrical power over and above the amount of power normally generated by an electrical power producing process. The term "non-peak demand periods" is meant to connote those periods at which an electrical power producing process is producing the amount of power normally generated by such a process.

During non-peak demand periods, a portion of the heat obtained by the heat exchange gas in heater 16 is stored in thermal storage zone 10 for use of such stored heat to generate increased electrical power at peak demand periods. Thus, as will be seen from FIG. 1, situated immediately outside thermal storage zone 10 is a system of valves generally indicated by reference numerals 32, 34, 36, and 40. These valves are conventional and are adapted to either permit the flow of fluid therethrough or alternatively can be activated to prevent fluid flow passage therethrough. During non-peak demand periods, the heat exchange gas from heater 16 is introduced into thermal storage zone 10 through line 78 so that a portion of the heat obtained by the heat exchange gas can be stored. Accordingly, in this situation (non-peak demand periods) valve 32 would be activated to the open position and valves 34 and 36 would be activated to the closed position; the heat exchange gas is thus directed from heater 16 through line 78 into thermal storage zone 10.

Thermal storage zone 10 comprises at least one thermal storage unit 14 as indicated in FIG. 1, but it should be expressly understood that a plurality of thermal storage units can be utilized in the process of the present invention; the number of units used and the size of these units will depend in part on the quantity of heat to be stored and the nature of the thermal storage medium contained in the units.

Thermal storage unit 14 is an apparatus capable of effecting heat transfer between the heat exchange gas and a thermal storage medium. Merely as illustrative, thermal storage unit 14 can be a conventional vertical shell and tube heat exchanger wherein the thermal storage medium, such as an inorganic salt, is stored in the shell side of the heat exchanger and the heat exchange gas is passed through the tubes. The thermal storage medium should possess the requisite physical properties and in addition have the appropriate heat capacity to enable it to pass from solid to liquid phase upon being heated by the heat exchange gas. These compositions should possess high heats of fusion, broad operative temperature ranges, and relative inertness. Inorganic compounds, preferably alkali metal hydroxides, particularly sodium hydroxide, are preferred as the thermal storage medium.

The heat exchange gas introduced into thermal storage zone 10 through line 78 is directed into thermal storage unit 14 where it is passed in indirect contact with the thermal storage medium. As a result, the thermal storage medium is heated to a temperature of about 450° to 900° F. which is sufficient to melt the solid thermal storage medium to a liquid.

During the melting procedure the thermal storage medium in the upper portion of thermal storage unit 14 should be melted first. In this way, the possibility that the thermal storage medium might cause damage to the unit by shifting or falling during melting is minimized. Similarly, during the solidification procedure, which takes place during peak demand periods, the thermal storage medium in the lower portion of thermal storage unit 14 should be solidified first to guard against the possibility of damage to the unit caused by the solidified thermal storage medium shifting or falling during the solidification procedure.

Thus, as will be seen in FIG. 1, during non-peak demand periods the heat exchange gas entering thermal storage unit 14 is introduced into the upper portion 15 of thermal storage unit 14 and withdrawn from the unit at the lower portion 17.

The heat exchange gas leaving the lower portion 17 of thermal storage unit 14 is directed into boiler 18 wherein additional heat obtained by the heat exchange gas in heater 16 is utilized to generate steam as will be discussed hereafter.

In those cases where more than one thermal storage unit is utilized, it is desirable to introduce the heat exchange gas into the thermal storage units, one unit at a time, until all of the units are charged with the appropriate amount of heat. Among the techniques by which this can be achieved is to provide line 78 as the source of heat exchange gas for each thermal storage unit and to position valves corresponding to valves 32, 34, 36, and 40 in FIG. 1 for each thermal storage unit employed. Hence, when more than one thermal storage unit is utilized, each thermal storage unit, e.g., thermal storage unit 14A, will have associated with it valves 32A, 34A, 36A, and 40A to control the flow of heat exchange gas from line 78. When a particular thermal storage unit is receiving heat exchange gas, the valve for that unit corresponding to valve 32 in FIG. 1 would be in the open position and the valves corresponding to valves 34, 36, and 40 would be in the closed position. According to this technique, the remaining thermal storage units will not receive heat exchange gas or be charged with heat while a particular thermal storage unit is being heated since the valves corresponding to valves 32, 34, 36, and 40 for these other thermal storage units will be closed.

In FIG. 2, an isometric view of an arrangement of two thermal storage units is depicted to illustrate the techniques for introducing heat exchange gas into the thermal storage units, one unit at a time during non-peak demand periods. FIG. 2 also depicts the technique for introducing heat exchange gas simultaneously through all the thermal storage units as will be discussed hereafter. Although two such units are indicated, the procedure described hereafter can be utilized in those cases where more than two units are employed.

Thus, referring to FIG. 2, during non-peak demand periods, the heat exchange gas in line 78 is directed into the upper portion 15A of the first thermal storage unit 14A through line 78A by activating valve 32A to the open position and activating valves 32B, 36B, 34A, 36A, and 40A to the closed position. Valve 34A is closed so no flow passes into line 110A as the gas passes down thermal storage unit 14A and into line 80 where it is returned to gas circulator 28 via boiler 18 and economizer 20. Valves 36A and 40A are closed to prevent backflow. It will be seen that all of the heat exchange gas from line 78 is directed into upper portion 15A of thermal storage unit 14A where it is passed in indirect contact with the thermal storage medium until the thermal storage medium is heated to a temperature of about 450° to 900° F. The heat exchange gas is withdrawn from thermal storage unit 14A through line 80A and is thereafter directed through line 80 into boiler 18 to generate steam as will be discussed hereafter.

After thermal storage unit 14A is charged with the appropriate amount of heat, the heat exchange gas is directed into thermal storage unit 14B. This is accomplished by opening valve 32B and closing valves 32A, 34B, and 40B. The heat exchange gas is then passed through thermal storage unit 14B until it also has absorbed the appropriate amount of heat. If more than two thermal storage units are employed, the procedure for storing heat in the thermal storage units, one unit at a time, described immediately above, is continued until all of the units are charged with the appropriate amount of heat.

As the heat exchange gas leaves thermal storage zone 10 there is still sufficient heat present in the heat exchange gas to generate steam, which steam can be used to operate steam turbine 22 for the generation of electrical power.

Referring again to FIG. 1, during non-peak demand periods valve 40 in line 82 is closed. Accordingly, the heat exchange gas is withdrawn from thermal storage zone 10 through line 80 at a temperature of about 500° to 600° F. and is introduced into boiler 18 where it is passed in indirect contact with water which enters boiler 18 through line 84 at a temperature of about 350° to 575° F. As a result of this indirect contacting, the water is converted into steam, which leaves boiler 18 through line 86 at a temperature of about 350° to 575° F. and a pressure of about 135 to 1275 p.s.i.a. The steam produced is directed into steam turbine 22 where it will be used as a source of energy for generating electrical power.

The cooled heat exchange gas exits boiler 18 through line 88 at a temperature of about 400° to 550° F. and is directed into economizer 20 wherein the heat exchange gas is passed in indirect contact with water which enters economizer 20 through line 102 at a temperature of about 230° to 300° F. The heated water is withdrawn from economizer 20 through line 84 at a temperature of about 350° to 575° F. and is introduced into boiler 18 wherein the water is boiled by the indirect contacting with heat exchange gas as mentioned above.

The indirect contacting of the heat exchange gas with water in economizer 20 cools the heat exchange gas to a temperature of about 350° to 400° F. Thus, substantially all of the heat obtained by the heat exchange gas by indirect contact with the exhaust gases in heater 16 is spent. The spent heat exchange gas is withdrawn from economizer 20 through line 90 at a temperature of about 350° to 400° F. and is introduced into gas circulator 28.

Gas circulator 28 is a conventional compressor which is adapted to increase the pressure of the heat exchange gas. Merely as illustrative, gas circulator 28 can be a double inlet single shape centrifugal compressor of the low head fan type. It should be understood that although a single gas circulator is shown in FIG. 1, more than one gas circulator can be used depending on the system load demand and the capacity of the gas circulator.

The heat exchange gas is withdrawn from gas circulator 28 through line 74 at a temperature of about 375° to 400° F. and introduced into heater 16 for further indirect contacting with the exhaust gases.

As indicated previously, it is desirable to produce electrical power with the steam exiting boiler 18. Moreover, other sources of heat are available in the coal gasification process plant, e.g., heat is available from the hot gas cooler (not shown) utilized therein. These other sources of heat termed "steam generation source" 52 can supply heat, which heat can be utilized to generate steam for use in the instant process. To accomplish this during non-peak demand periods valve 64 is activated to the closed position.

Thus, as will be seen from FIG. 1, steam exiting boiler 18 is directed to steam turbine 22 through lines 86 and 94 and is combined in line 96 with steam exiting steam generation source 52 through line 92. The steam from steam generation source 52 is at a temperature of about 350° to 575° F. and a pressure of about 135 to 1275 p.s.i.a. The combined steam in line 96 is introduced into steam turbine 22 at a temperature of about 350° to 575° F. and a pressure of about 135 to 1275 p.s.i.a.

Steam turbine 22 is a conventional steam turbine which is normally used as a driving force for operating an electrical power producing generator. Thus, associated with the steam turbine 22 is a conventional generator 26 which is suitable for generating electrical power by techniques which are well known to those skilled in the art.

It is desirable that during non-peak demand periods the steam available from line 96 be sufficient to enable steam turbine 22 to operate at about 20% of its capacity. Advantageously, according to the present invention, steam turbine 22 can be made to operate at full capacity or nearly full capacity to supply increased electrical power at peak demand periods by utilizing the heat stored in thermal storage zone 10 in a manner that will be discussed in detail hereafter.

The operation of steam turbine 22 substantially reduces the temperature and pressure of the steam. Thus, steam is withdrawn from steam turbine 22 through line 98 at a temperature of about 100° to 150° F. and is introduced into condenser 54. Condenser 54 is a conventional heat exchanger which is adapted to condense vapors to a liquid.

Condensed water is withdrawn from condenser 54 through line 100 at a temperature of about 100° to 150° F. and is pumped by means of pump 56 into a conventional deaerator 62.

During non-peak demand periods the water leaving deaerator 62 is directed to two sources, i.e., to economizer 20 and to steam generation source 52. To accomplish this, valve 66 is activated to the closed position. Thus, the deaerated water is withdrawn from deaerator 62 at a temperature of about 230° to 300° F. and is directed through line 102 into economizer 20 with a portion of the water in line 102 being diverted through line 104 into steam generation source 52 where the water will be reheated to generate steam.

The procedure for storing heat and generating electrical power during non-peak demand periods described in detail hereinabove is continued until it is desired to generate steam and provide increased electrical power at peak demand periods.

During peak demand periods, the heat stored in thermal storage zone 10 can be utilized to produce steam, which steam can be used to generate increased electrical power. In this situation (peak demand periods) it is desirable to combine the heat exchange gas directed from heater 16 through line 78 with the gases being circulated through thermal storage zone 10 and steam generator 42 by booster circulator 30 so that a mixture termed "combined heat exchange gas" is formed, which combined heat exchange gas is utilized to obtain the heat stored in thermal storage zone 10.

During peak demand periods the combined heat exchange gas is introduced into thermal storage zone 10 through line 80. Accordingly, valves 36 and 34 would be activated to the open position and valve 32 would be activated to the closed position.

The combined heat exchange gas is introduced into thermal storage zone 10 through line 80 and directed into thermal storage unit 14 where it is passed in indirect contact with the thermal storage medium. As a result, the combined heat exchange gas is heated to a temperature of about 450° to 850° F. and the thermal storage medium is cooled to a temperature of about 450° to 900° F. which at this temperature is in the form of a solid. The combined heat exchange gas is introduced into lower portion 17 of thermal storage unit 14 in order to minimize the possibility of damage to the unit during the solidification procedure as discussed previously.

The heat obtained by the combined heat exchange gas in thermal storage zone 10 is utilized to produce steam, which steam can be used to produce increased electrical power at peak demand periods. Thus, during peak demand periods valve 34 associated with line 110 is activated to the open position and valve 40 associated with line 82 is also activated to the open position. The combined heat exchange gas is withdrawn from thermal storage zone 10 through line 78 by booster circulator 30 at a temperature of about 450° to 850° F. and is directed through line 110. Booster circulator 30 is a conventional fan which is adapted to increase the pressure of the combined heat exchange gas.

The steam used during peak requirement periods is generated in part with the heat obtained by the combined heat exchange gas in thermal storage zone 10. Thus, the heated combined heat exchange gas is circulated by booster circulator 30 through line 112 at a temperature of about 450° to 850° F. and is introduced into steam generator 42 wherein it is passed in indirect contact with water which enters steam generator 42 through line 114 at a temperature of about 230° to 300° F. Steam generator 42 is a conventional heat exchanger and can be of the type generally known to the art as the shell and tube type.

Still operating at peak demand periods, valve 66 is opened which permits water from deaerator 62 to enter steam generator 42 through line 114. Thus, a portion of the water exiting deaerator 62 through line 102 is diverted through line 114 into steam generator 42. During peak demand periods additional water may be needed for maintaining optimum performance. This additional water can be obtained from a storage tank (not shown) associated with deaerator 62.

As a result of the indirect contacting of the combined heat exchange gas with water in steam generator 42, steam is produced at a temperature of about 350° to 525° F. and a pressure of about 135 to 1275 p.s.i.a., which steam will be used as a source of energy for generating increased electrical power at peak demand periods.

As the combined heat exchange gas leaves steam generator 42, there is still sufficient heat present in the combined heat exchange gas to generate steam for use in steam turbine 22. Thus, during peak demand periods valve 40 is opended; the combined heat exchange gas exiting steam generator 42 at a temperature of about 400° to 600° F. is returned to thermal storage zone 10 through line 80 with a portion of the combined heat exchange gas being diverted into boiler 18.

In the system shown in FIG. 1, the combined heat exchange gas flowing into boiler 18 is directed from steam generator 42. Alternatively, the gas introduced into boiler 18 can be directed from heater 16. Thus referring to FIG. 3, an alternative to the system depicted in FIG. 1 is shown wherein the heat exchange gas from heater 16 is introduced directly into boiler 18. In this arrangement wherein like lines are designated by like reference numerals, the heat exchange gas in line 78 from heater 16 is diverted through line 108 into boiler 18 through line 82. In this embodiment substantially all of the heat exchange gas from steam generator 42 is returned to thermal storage zone 10 through line 80 and the flow rate of gas in the section of line 82 between lines 80 and 108 is negligible. It will be seen that the embodiment shown in FIG. 3 provides an arrangement wherein the heat exchange gas from heater 16 can be introduced directly into boiler 18 during both peak and non-peak demand periods. In this way the heat exchange gas can be made to by-pass thermal storage zone 10 when it becomes expedient not to introduce gas into thermal storage zone 10.

In FIG. 4 still another arrangement for introducing heat exchange gas into boiler 18 is shown. According to this arrangement heat exchange gas from heater 16 is directed through line 108 into line 82 where it is admixed with heat exchange gas from steam generator 42. This admixture is thereupon directed into thermal storage zone 10 through line 80 with a portion being introduced into boiler 18 through line 82.

In each of the arrangements for introducing heat exchange gas into boiler 18 described above it is preferred that the flow rate of heat exchange gas passing through boiler 18 be approximately equal during both peak and non-peak demand periods. This can be achieved by controlling the operating pressure of gas circulator 28. Alternatively, conventional valves (not shown) can be provided to control the flow rate of heat exchange gas into boiler 18.

Referring again to FIG. 1, the portion of the combined heat exchange gas which is not diverted into boiler 18 is returned to thermal storage zone 10 through line 80 where it is recirculated through thermal storage unit 14 to obtain additional quantities of stored heat.

The combined heat exchange gas diverted into boiler 18 through line 82 is passed in indirect contact with water which enters boiler 18 through line 84 at a temperature of about 350° to 575° F. The steam produced in boiler 18 leaves through line 86 at a temperature of about 350° to 575° F. and a pressure of about 135 to 1275 p.s.i.a. and is directed into steam turbine 22 where it is to be used as a source of energy for generating electrical power.

The cooled combined heat exchange gas exits boiler 18 through line 88 at a temperature of about 400° to 550° F. and is introduced into economizer 20 wherein the combined heat exchange gas is passed in indirect contact with water from a source which will be discussed hereafter which enters economizer 20 through line 102 at a temperature of about 230° to 300° F.

The heated water is withdrawn from economizer 20 through line 84 at a temperature of about 350° to 575° F. and is introduced into boiler 18 wherein the water is boiled by the indirect contacting with combined heat exchange gas as mentioned hereinabove.

As a result of the indirect contacting of the combined heat exchange gas with water in economizer 20, the combined heat exchange gas is cooled to a temperature of about 350° to 400° F. The combined heat exchange gas is withdrawn from economizer 20 through line 90 at a temperature of about 350° to 400° F. and is introduced into gas circulator 28. The combined heat exchange gas is withdrawn from gas circulator 28 through line 74 at a temperature of about 375° to 400° F. and is directed into heater 16 wherein the combined heat exchange gas is heated by the indirect contacting with exhaust gases from gas turbine 12 which enter through line 72 at a temperature of about 950° to 1150° F.

The exhaust gases leave heater 16 through line 76 at a temperature of about 425° to 600° F. and are directed into stack 60 where they are released to the atmosphere.

The heated combined heat exchange gas leaves heater 16 through line 78 at a temperature of about 500° to 1000° F. and is directed back into thermal storage zone 10 for further indirect contacting with the thermal storage medium.

As discussed above, for systems utilizing more than one thermal storage unit it is desirable during peak demand periods to pass the combined heat exchange gas through all the thermal storage units at the same time in order to obtain the stored heat at a rate which is faster than the rate at which it was stored.

To direct the heat exchange gas into the lower portions of all the thermal storage units at the same time, the valves associated with each of the thermal storage units corresponding to valves 34, 36, and 40 in FIG. 1 are activated to the open position, and the valves corresponding to valve 32 are activated to the closed position.

Thus, referring to FIG. 2, the heat exchange gas in line 78 is directed to lower portions 17A and 17B of thermal storage units 14A and 14B, respectively, by activating valves 32A and 32B to the closed position and activating valves 34A, 34B, 36A, 36B, 40A, and 40B to the open position. Valves 32A and 32B are closed to prevent the heat exchange gas from entering upper portions 15A and 15B of the thermal storage units. The heat exchange gas in line 78 is directed through lines 78A, 78B, 108A, and 108B into lower portions 17A and 17B of the thermal storage units where it is passed upwardly through the thermal storage units in indirect contact with the thermal storage medium. The heat exchange gas leaves the thermal storage units through lines 78A and 78B and is directed into booster circulator 30 through lines 110, 110A, and 110B. The heat exchange gas exits booster circulator 30 through lines 112A and 112B and is introduced into steam generators 42A and 42B for the generation of steam. The heat exchange gas exits the steam generators through lines 82A and 82B and is combined with the heat exchange gas from lines 108A and 108B to form an admixture termed "combined heat exchange gas." The combined heat exchange gas is introduced into lower portions 17A and 17B of the thermal storage units through lines 80A and 80B with a portion being diverted to boiler 18 through line 80. The heat exchange gas introduced into the thermal storage units is passed upwardly through the units in indirect contact with the thermal storage medium to obtain additional quantities of stored heat. The heat exchange gas is thereafter recirculated through the thermal storage units in the foregoing manner throughout the peak demand period.

Referring again to FIG. 1, as indicated previously, it is desirable to produce increased electrical power at peak demand periods with the steam exiting steam generator 42 through line 102. In addition, the steam produced in boiler 18 and steam generation source 52 is used at peak demand periods to generate electrical power.

Thus, as will be seen from FIG. 1, steam produced in steam generator 42 which is at a temperature of about 350° to 575° F. leaves steam generator 42 through line 120 and is passed through valve 64, which at this stage is in the open position. The steam leaves valve 64 through line 120 and is introduced into line 94 where it is combined with the steam exiting boiler 18 through line 86. The combined steam from steam generator 42 and boiler 18 in line 94 which is at a temperature of about 350° to 575° F. is directed through line 94 into line 96 where it is joined with steam at a temperature of about 350° to 575° F. leaving steam generation source 52 through line 92. The combined steam from steam generator 42, boiler 18, and steam generation source 52 is directed through line 96 into steam turbine 22 wherein the steam is utilized to drive steam turbine 22.

Therefore, at peak demand periods, an additional supply of steam, provided by steam generator 42, is introduced into steam turbine 22. Accordingly, generator 26 associated with steam turbine 22 can be made to operate at increased capacity, desirably at full capacity or nearly full capacity, at peak demand periods to supply increased electrical power. Thus, at peak demand periods the quantity of steam produced by passing the combined heat exchange gas through steam generator 42 and boiler 18 is sufficient to increase the total plant electrical power output over non-peak demand periods in an amount of about 30 to 60%.

The steam utilized in steam turbine 22 is withdrawn through line 98 at a temperature of about 100° to 150° F. and is introduced into condenser 54. The condensed water is withdrawn from condenser 54 through line 100 at a temperature of about 100° to 150° F. and is pumped by means of pump 56 into deaerator 62. During peak demand periods, the water leaving deaerator 62 is directed into steam generation source 52, economizer 20, and steam generator 42. Thus, the deaerated water is withdrawn from deaerator 62 at a temperature of about 230° to 300° F. and is directed through line 102 into economizer 20 with a portion of the water in line 102 being diverted through line 104 into steam generation source 52 and another portion of the water in line 102 being diverted through line 114 into steam generator 42 where the water will be reheated to generate steam.

In a typical mode of operation, with reference to FIG. 1, fuel gas from a coal gasification process which is at a temperature of 90° F. and a pressure of about 215 p.s.i.a. is introduced into the combustor of gas turbine 12 through line 68 at a rate of 43,000 S.C.F.M. wherein it is reacted with combustion air which is introduced into gas turbine 12 through line 70 at a rate of 1,900,000 lb./hr., a temperature of 90° F. and a pressure of 165 p.s.i.a.

The reaction of the fuel gas with combustion air serves to drive turbine 12 which in turn operates generator 24 to produce 70,000 kw./hr. of electrical power.

The exhaust gases are removed from gas turbine 12 through line 72 at a rate of 2 million lb./hr., a temperature of 1075° F., and a pressure of 15 p.s.i.a. and are directed into heater 16 where they are utilized to heat air which is circulated through the heater.

During non-peak demand periods, air is introduced into heater 16 through line 74 at a rate of 2,200,000 lb./hr., a temperature of 400° F., and a pressure of 18½ p.s.i.a.

The exhaust gases are removed from heater 16 through line 76 at a rate of 2 million lb./hr., a temperature of about 510° F., and a pressure of 15 p.s.i.a. and are released to the atmosphere through stack 60.

The heated air is discharged from heater 16 through line 78 at a rate of 2,200,000 lb./hr., a temperature of 910° F., and a pressure of 17½ p.s.i.a. and is directed to thermal storage zone 10. For this mode of operation, (non-peak demand periods) valve 32 is in the open position and valves 34 and 36 are in the closed position. Thus, the heated air is not diverted and is introduced into thermal storage zone 10 from line 78.

The heated air introduced into thermal storage zone 10 is directed into the upper portion 15 of thermal storage unit 14 where it is passed in indirect contact with solid sodium hydroxide. As a result, the sodium hydroxide is heated to a temperature of 625° F. which at this temperature is sufficient to melt the solid sodium hydroxide to the liquid state. During this mode of operation valve 40 is in the closed position. Thus, the resultant cooled air in thermal storage unit 14 is permitted to be discharged from thermal storage zone 10 through line 80 at a rate of 2,200,000 lb./hr., a temperature of 600° F., and a pressure of 16 p.s.i.a. and is thereafter introduced into boiler 18.

As the air leaves thermal storage zone 10 there is still sufficient heat present in the air to generate steam in boiler 18. Thus, water is introduced into boiler 18 through line 84 at a rate of 153,000 lb./hr., and a temperature of 496° F. and is passed in indirect contact with the air in boiler 18 for a time sufficient to produce steam, which steam is shown leaving boiler 18 through line 86 at a rate of 153,000 lb./hr., a temperature of 496° F., and a pressure of 660 p.s.i.a. and is directed to steam turbine 22 through lines 86, 94, and 96 for subsequent utilization to generate electrical power.

The cooled air is discharged from boiler 18 at a rate of 2,200,000 lb./hr., a temperature of 540° F., and a pressure of 16½ p.s.i.a. and is introduced into economizer 20 through line 88 wherein the air is used to heat water, which is directed at a temperature of 240° F. from deaerator 62 into economizer 20 through line 102 at a rate of 153,000 lb./hr.

In economizer 20, the water is heated to a temperature of 496° F. and is directed through line 84 into boiler 18 at a rate of 153,000 lb./hr.

The cooled air leaves economizer 20 through line 90 at a rate of 2,200,000 lb./hr., a temperature of 350° F., and a pressure of 16 p.s.i.a. and is introduced into gas circulator 28 wherein the air pressure is increased to about 19 p.s.i.a. The air at the increased pressure is thereafter directed back to heater 16 for further heating by the exhaust gases as explained previously.

During non-peak demand periods, electrical power is produced by utilizing the steam produced in boiler 18 and steam generation source 52. The steam exiting boiler 18 is directed to steam turbine 22 through lines 86 and 94 and is combined in line 96 with steam exiting steam generation source 52 through line 92. The steam is discharged from steam generation source 52 at a rate of 55,000 lb./hr., a temperature of 496° F., and a pressure of 660 p.s.i.a. The combined steam in line 96 is introduced into steam turbine 22 at a rate of 208,000 lb./hr., a temperature of 496° F. and a pressure of 660 p.s.i.a. As a result, during non-peak demand periods steam turbine 22 is only operated at 20% of its capacity. Thus, generator 26 which is driven by steam turbine 22 produces 10,000 kw./hr. of electrical power during non-peak demand periods.

The steam utilized in steam turbine 22 is withdrawn at a rate of 208,000 lb./hr., a temperature of 115° F., and a pressure of 16 p.s.i.a. and is introduced into condenser 54. The condensed water leaves condenser 54 at a rate of 208,000 lb./hr., and a temperature of 115° F. through line 100 and is pumped by means of pump 56 into deaerator 62 wherein dissolved gases are removed from the water. The deaerated water leaves deaerator 62 through line 102 and is introduced into economizer 20 at a rate of 153,000 lb./hr., and a temperature of 240° F., with a portion of the water from line 102 being pumped through line 104 into steam generation source 52 at a rate of 55,000 lb./hr. and a temperature of 240° F.

During the second mode of operation (i.e., during peak demand periods) wherein additional steam is required to produce increased electrical power, the air in line 78 from heater 16 is admixed with the air in thermal storage zone 10 and in the system associated with booster circulator 30 and steam generator 42 to form a "combined air" mixture.

The combined air introduced into thermal storage zone 10 is directed into lower portion 17 of thermal storage unit 14 wherein it is passed in indirect contact with the melted sodium hydroxide. As a result, the sodium hydroxide is cooled to a temperature of 610° F., which at this temperature is sufficient to change the liquid sodium hydroxide to the solid state.

During this mode of operation (peak demand periods) valves 34 and 40 are in the open position. Thus, the resultant heated combined air in thermal storage zone 10 is permitted to be discharged from thermal zone 10 through line 78 at a rate of 9,400,000 lb./hr., a temperature of 600° F., and a pressure of 16 p.s.i.a. and is, thereafter, directed through line 110 into booster circulator 30 wherein the flow rate of the combined air is 9,400,000 lb./hr. The combined air leaves booster circulator 30 through line 112 at a temperature of 600° F. and a pressure of 17 p.s.i.a. and is introduced into steam generator 42 wherein the combined air is utilized to produce steam. Accordingly, water is introduced into steam generator 42 through line 114 at a rate of 360,000 lb./hr. and a temperature of 240° F. and is passed in indirect contact with the combined air in steam generator 42 for a time sufficient to produce steam, which steam is withdrawn from steam generator 42 through line 120, at a rate of 360,000 lb./hr., a temperature of 496° F., and a pressure of 660 p.s.i.a. is passed through open valve 64, and is directed to steam turbine 22 for subsequent utilization to generate electrical power.

The water introduced into steam generator 42 is directed from deaerator 62 by opening valve 66. Additional water necessary for generating increased amounts of steam during peak demand periods is obtained from a storage tank (not shown) associated with deaerator 62.

The combined air exiting steam generator 42 is recirculated through thermal storage zone 10 to obtain additional quantities of stored heat with a portion being diverted through line 82 to generate additional steam in boiler 18. Thus valve 40 is activated to the open position and the combined air leaves steam generator 42 through line 82 at a temperature of 545° F. and is returned to thermal storage zone 10 through line 80 at a rate of 7,200,000 lb./hr. The remaining portion of the combined air from steam generator 42 is diverted through line 82 into boiler 18 at a rate of 2,200,000 lb./hr. In boiler 18 the combined air is passed in indirect contact with water which enters boiler 18 through line 84 at a rate of 153,000 lb./hr. and a temperature of 496° F. As a result of this indirect contacting, steam is produced, which steam is shown leaving boiler 18 through line 86 at a rate of 153,000 lb./hr., a temperature of 496° F., and a pressure of 660 p.s.i.a. and is directed to steam turbine 22 for sebsequent utilization to generate electrical power.

The cooled combined air is discharged from boiler 18 at a rate of 2,200,000 lb./hr., a temperature of 540° F., and a pressure of 16 p.s.i.a. and is introduced into economizer 20 through line 88 wherein the combined air is used to heat water which is directed at a temperature of 240° F. from deaerator 62 into economizer 20 through line 102 at a rate of 153,000 lb./hr.

In economizer 20, the water is heated to a temperature of 496° F. and is directed through line 84 into boiler 18 at a rate of 153,000 lb./hr.

The cooled combined air leaves economizer 20 through line 90 at a rate of 2,200,000 lb./hr., a temperature of 350° F., and a pressure of 15½ p.s.i.a. and is introduced into gas circulator 28. The pressure of the air is increased by the gas circulator to 18½ p.s.i.a. The combined air at the increased pressure is thereafter directed to heater 16 wherein it is heated by the indirect contacting with exhaust gases which enter heater 16 through line 72 at a rate of 2,000,000 lb./hr., a temperature of 1075° F., and a pressure of 15 p.s.i.a. The heated combined air leaves heater 16 at a rate of 2,200,000 lb./hr., a temperature of 910° F., and a pressure of 18 p.s.i.a. and is directed back to thermal storage zone 10 for further heating by the sodium hydroxide as explained previously.

The exhaust gases utilized in heater 16 are the exhaust gases from gas turbine 12. Thus, in this mode of operation (peak demand periods) fuel gas from a coal gasification process which is at a temperature of 90° F. and a pressure of 200 p.s.i.a. is introduced into gas turbine 12 through line 68 at a rate of 43,000 S.C.F. M. wherein the fuel gas is reacted with combustion air which is introduced into gas turbine 12 through line 70 at a rate of 1,900,000 lb./hr., a temperature of 90° F., and a pressure of 150 p.s.i.a.

The reaction of the fuel gas with combustion air serves to drive gas turbine 12 which in turn operates generator 24 to produce 70,000 kw./hr. of electrical power.

The exhaust gases produced in gas turbine 12 are removed through line 72 at a rate of 2 million lb./hr., a temperature of 1075° F., and a pressure of 15 p.s.i.a. and are directed into heater 16 wherein they are utilized to heat the combined air as discussed hereinabove.

The exhaust gases are removed from heater 16 through line 76 at a rate of 2 million lb./hr., a temperature of 510° F., and a pressure of 15 p.s.i.a. and are released to the atmosphere through stack 60.

During peak demand periods, electrical power is produced by utilizing the steam produced in boiler 18, steam generator 42, and steam generation source 52. Thus, steam exiting boiler 18 is directed to steam turbine 22 through line 86 and is combined in line 94 with the steam exiting steam generator 42 through line 120. The combined steam from boiler 18 and steam generator 42 in line 94 which is at a temperature of 496° F. and a pressure of 660 p.s.i.a. is directed through line 94 at a rate of 513,000 lb./hr. into line 96 where it is joined with steam leaving steam generation source 52 through line 92. The steam is discharged from steam generation source 52 at a rate of 55,000 lb./hr., a temperature of 496° F., and a pressure of 660 p.s.i.a. The combined steam in line 96 is introduced into steam turbine 22 at a rate of 568,000 lb./hr., a temperature of 496° F., and a pressure of 660 p.s.i.a. As a result, during peak demand periods, steam turbine 22 is operated at full capacity or nearly full capacity. Thus, generator 26 which is driven by steam turbine 22 produces 40,000 kw./hr. of electrical power during peak demand periods.

The steam utilized in steam turbine 22 is withdrawn at a rate of 568,000 lb./hr., a temperature of 115° F., and a pressure of 16 p.s.i.a. and is introduced into condenser 54. The condensed water leaves condenser 54 at a rate of 568,000 lb./hr. and a temperature of 115° F. through line 100 and is pumped by means of pump 56 into deaerator 62 wherein dissolved gases are removed from the water. The deaerated water leaves deaerator 62 through line 102 and is introduced into economizer 20 at a rate of 153,000 lb./hr. and a temperature of 240° F., with a portion of the water from line 102 being diverted through line 104 into steam generation source 52 at a rate of 55,000 lb./hr. and a temperature of 240° F., and another portion of the water from line 102 being diverted through line 114 into steam generator 24 at a rate of 360,000 lb./hr. and a temperature of 240° F.

While I have fully described an embodiment of the foregoing invention, it is to be understood that this description is offered by way of illustration only. The range of adaptability of the process presented herein is contemplated to include many variations and adaptions of the subject matter within the scope of generating increased electrical power at peak demand periods, and it is to be understood that this invention is to be limited only by the scope of the appended claims.

What is claimed is:

1. In a process for the generation of electrical power wherein coil is gasified and these gases are burned to produce a stream of heated fuel gases which are introduced into an electrical power generation zone to generate electrical power during peak and non-peak electrical power demand periods and wherein heated exhaust gases are released from said electrical power generation zone, the improvement which utilizes the heat released by said exhaust gases to generate increased electrical power during peak demand periods comprising:
    (i) passing a heat exchange gas in contact with said heated exhaust gases to heat said heat exchange gas with heat released by said exhaust gases;
    (ii) introducing said heated heat exchange gas into a thermal storage zone wherein during non-peak demand periods a portion of the heat released by said heated heat exchange gas is stored in said thermal storage zone for use during peak demand periods;
    (iii) passing said heat exchange gas discharged from said thermal storage zone into a first steam generation zone wherein the remaining portion of heat of said heated heat exchange gas is utilized to generate steam for producing electrical power during non-peak demand periods;
    (iv) during peak demand periods admixing said heated heat exchange gas from step (i) with additional heat exchange gas;
    (v) introducing said admixture into said thermal storage zone to heat said admixture with the heat stored in said thermal storage zone;
    (vi) passing the heated admixture discharged from said thermal storage zone into a second steam generation zone wherein the heat of said admixture is utilized to generate steam for producing increased electrical power during peak demand periods;
    (vii) recirculating a portion of the admixture discharged from said second steam generation zone back into said thermal storage zone to heat said recirculated admixture with the heat stored in said thermal storage zone;
    (viii) directing the remaining portion of the admixture discharged from said second steam generation zone into said first steam generation zone to generate steam for producing electrical power;
    (ix) heating the admixture discharged from said first steam generation zone with said exhaust gases; and
    (x) admixing said recirculating portion of admixture of step (vii) with said heated admixture of step (ix) and introducing same into said thermal storage zone.

2. A process according to claim 1 wherein said heat exchange gas is selected from the group consisting of air, helium, hydrogen, nitrogen, argon, carbon dioxide and low oxygen content combustion products of hydrocarbons.

3. A process according to claim 1 wherein said heat exchange gas is air.

4. A process according to claim 1 wherein said thermal storage zone includes at least one thermal storage unit containing a thermal storage medium.

5. A process according to claim 4 wherein said thermal storage medium is an inorganic chemical compound which is transformed from solid phase to liquid phase during non-peak demand periods and from liquid phase to solid phase during peak demand periods.

6. A process according to claim 4 wherein said thermal storage medium is an alkali metal hydroxide.

7. A process according to claim 6 wherein said alkali metal hydroxide is sodium hydroxide.

8. A process according to claim 4 wherein said thermal storage unit has an upper portion and a lower portion and said heated heat exchange gas is introduced in step (ii) into said upper portion of said thermal storage unit.

9. A process according to claim 4 wherein said thermal storage unit has an upper portion and a lower portion and said admixture is introduced in step (v) into said lower portion of said thermal storage unit.

10. A process according to claim 1 wherein said thermal storage zone includes a plurality of thermal storage units containing a thermal storage medium.

11. A process according to claim 10 wherein said heat exchange gas is introduced in step (ii) into said thermal storage units one unit at a time.

12. A process according to claim 10 wherein said admixture is introduced in step (v) into all of said thermal storage units at the same time.

13. A process according to claim 1 wherein the increased quantity of steam produced during peak demand periods is sufficient to increase electrical power output over non-peak demand periods in an amount of about 30 to 60%.

* * * * *